US007711685B1

(12) United States Patent
Deffler et al.

(10) Patent No.: US 7,711,685 B1
(45) Date of Patent: May 4, 2010

(54) METHOD AND SYSTEM FOR AN EXTENSIBLE MACRO LANGUAGE

(75) Inventors: Tad A. Deffler, Boonton, NJ (US); Eric Mintz, Metuchen, NJ (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/419,749

(22) Filed: Oct. 16, 1999

Related U.S. Application Data

(60) Provisional application No. 60/104,682, filed on Oct. 16, 1998.

(51) Int. Cl.
*G06F 7/00* (2006.01)
*G06F 17/30* (2006.01)
*G06F 9/44* (2006.01)

(52) U.S. Cl. .......................... 707/100; 707/2; 717/106; 717/114

(58) Field of Classification Search .................. 707/1, 707/2, 100, 209, 3, 8, 500, 513, 526; 715/1, 715/500, 513, 526; 717/106, 114–118, 122, 717/124, 140, 3, 8; 712/3, 209; 703/3; 345/340, 345/348
See application file for complete search history.

(56) References Cited

U.S. PATENT DOCUMENTS

| 3,656,178 | A | * | 4/1972 | De Maine et al. ............. 341/87 |
| 4,667,290 | A | * | 5/1987 | Goss et al. .................. 717/147 |
| 4,787,035 | A | * | 11/1988 | Bourne ........................ 700/247 |
| 4,931,928 | A | | 6/1990 | Greenfeld ..................... 717/8 |
| 4,949,253 | A | | 8/1990 | Chigira et al. ................. 717/2 |
| 5,070,534 | A | | 12/1991 | Lascelles et al. ............. 345/348 |
| 5,245,675 | A | | 9/1993 | Ferre et al. .................... 382/27 |
| 5,257,363 | A | | 10/1993 | Shapiro et al. ............... 395/500 |
| 5,276,880 | A | | 1/1994 | Platoff et al. .................. 717/8 |
| 5,295,059 | A | * | 3/1994 | Brooks et al. ................ 700/18 |

(Continued)

FOREIGN PATENT DOCUMENTS

EP    0 396 310    5/1990

(Continued)

OTHER PUBLICATIONS

Hyde, Peter, "White Paper: Creating applications with WebHub VCL," www.webhub.com/WHVCLWHP:817032661, pp. 9-11, 1995.*

(Continued)

*Primary Examiner*—Ella Colbert
(74) *Attorney, Agent, or Firm*—Baker Botts L.L.P.

(57) ABSTRACT

A method and system for an extensible macro language is provided. The system for providing the extensible macro language includes a parser and a macro handler for processing macro commands not previously defined in the macro language. The parser analyzes keywords in a macro language expression and recognizes one or more keywords representing macro commands that were not previously defined in the macro language. The macro handler receives the keywords in the macro expression and retrieves from a registry of keywords, an executable code or procedure associated with the keyword. The executable code is run to process the macro command represented by the keyword. The template language registry may be augmented to include any keywords and associated codes for extending the macro language.

14 Claims, 1 Drawing Sheet

U.S. PATENT DOCUMENTS

| | | | | |
|---|---|---|---|---|
| 5,295,256 | A | 3/1994 | Bapat | 717/137 |
| 5,421,016 | A | 5/1995 | Conner et al. | 395/700 |
| 5,481,718 | A | 1/1996 | Ryu et al. | 395/700 |
| 5,495,613 | A * | 2/1996 | Brody | 717/110 |
| 5,513,314 | A | 4/1996 | Kandasamy et al. | 714/6 |
| 5,517,641 | A | 5/1996 | Barry et al. | 707/101 |
| 5,548,758 | A | 8/1996 | Pirahesh et al. | 707/2 |
| 5,550,971 | A | 8/1996 | Brunner et al. | 375/161 |
| 5,596,746 | A | 1/1997 | Shen et al. | 707/101 |
| 5,638,381 | A | 6/1997 | Cho et al. | 371/22.4 |
| 5,644,764 | A | 7/1997 | Johnson et al. | 395/614 |
| 5,649,203 | A * | 7/1997 | Sites | 717/156 |
| 5,692,195 | A | 11/1997 | Conner et al. | 395/685 |
| 5,694,539 | A * | 12/1997 | Haley et al. | 714/38 |
| 5,699,310 | A * | 12/1997 | Garloff et al. | 717/108 |
| 5,701,487 | A * | 12/1997 | Arbouzov | 717/124 |
| 5,715,453 | A * | 2/1998 | Stewart | 715/513 |
| 5,717,924 | A | 2/1998 | Kawai | 395/613 |
| 5,721,895 | A * | 2/1998 | Velissaropoulos et al. | 707/104.1 |
| 5,721,915 | A | 2/1998 | Sockut et al. | 707/201 |
| 5,721,925 | A | 2/1998 | Cheng et al. | 395/683 |
| 5,721,929 | A | 2/1998 | Pasquariello | 717/168 |
| 5,724,425 | A | 3/1998 | Chang et al. | 380/25 |
| 5,732,192 | A | 3/1998 | Malin et al. | 395/10 |
| 5,734,907 | A | 3/1998 | Jarossay et al. | 717/8 |
| 5,737,592 | A * | 4/1998 | Nguyen et al. | 700/18 |
| 5,742,828 | A * | 4/1998 | Canady et al. | 717/8 |
| 5,761,494 | A | 6/1998 | Smedley et al. | 707/4 |
| 5,764,978 | A | 6/1998 | Masumoto | 707/100 |
| 5,768,586 | A | 6/1998 | Zweben et al. | 395/653 |
| 5,790,861 | A * | 8/1998 | Rose et al. | 717/145 |
| 5,794,229 | A | 8/1998 | French et al. | 707/2 |
| 5,802,511 | A | 9/1998 | Kouchi et al. | 707/2 |
| 5,815,415 | A * | 9/1998 | Bentley et al. | 703/4 |
| 5,819,305 | A * | 10/1998 | Nixon | 711/100 |
| 5,822,750 | A | 10/1998 | Jou et al. | 707/2 |
| 5,855,014 | A * | 12/1998 | Smith | 707/3 |
| 5,857,197 | A | 1/1999 | Mullins | 707/103 R |
| 5,878,411 | A | 3/1999 | Burroughs et al. | 707/4 |
| 5,905,982 | A | 5/1999 | Carey et al. | 707/4 |
| 5,974,201 | A | 10/1999 | Chang et al. | 382/305 |
| 5,974,253 | A | 10/1999 | Nahaboo et al. | 395/701 |
| 5,974,407 | A | 10/1999 | Sacks | 707/2 |
| 5,978,789 | A | 11/1999 | Griffin et al. | 707/2 |
| 5,983,016 | A | 11/1999 | Brodsky et al. | 395/701 |
| 5,987,123 | A | 11/1999 | Scott et al. | 380/4 |
| 6,003,037 | A | 12/1999 | Kassabgi et al. | 707/103 |
| 6,011,917 | A | 1/2000 | Leymann et al. | 395/702 |
| 6,031,993 | A * | 2/2000 | Andrews et al. | 707/100 |
| 6,052,720 | A | 4/2000 | Traversat et al. | 709/220 |
| 6,065,002 | A | 5/2000 | Knotts et al. | 707/4 |
| 6,081,774 | A * | 6/2000 | de Hita et al. | 704/9 |
| 6,085,120 | A * | 7/2000 | Schwerdtfeger et al. | 700/90 |
| 6,091,895 | A | 7/2000 | Govindaraj | 395/702 |
| 6,105,043 | A * | 8/2000 | Francisco et al. | 707/513 |
| 6,112,024 | A | 8/2000 | Almond et al. | 395/703 |
| 6,112,304 | A | 8/2000 | Clawson | 713/156 |
| 6,112,649 | A | 9/2000 | Jeong | 99/492 |
| 6,114,978 | A | 9/2000 | Hoag | 341/23 |
| 6,182,274 | B1 * | 1/2001 | Lau | 717/104 |
| 6,226,792 | B1 | 5/2001 | Goiffon et al. | 717/11 |
| 6,243,709 | B1 | 6/2001 | Tung | 707/103 R |
| 6,247,020 | B1 | 6/2001 | Minard | 707/104 |
| 6,292,811 | B1 | 9/2001 | Clancey et al. | 707/503 |
| 6,374,252 | B1 | 4/2002 | Althoff et al. | 707/102 |
| 6,374,256 | B1 | 4/2002 | Ng et al. | 707/103 R |
| 6,385,610 | B1 | 5/2002 | Deffler et al. | 707/6 |
| 6,385,767 | B1 | 5/2002 | Ziebell | 717/11 |
| 6,446,109 | B2 | 9/2002 | Gupta | 709/203 |
| 6,453,356 | B1 | 9/2002 | Sheard et al. | 709/231 |
| 6,502,234 | B1 | 12/2002 | Gauthier et al. | 717/107 |
| 6,513,152 | B1 | 1/2003 | Branson et al. | 717/100 |
| 6,601,023 | B1 | 7/2003 | Deffler et al. | 703/13 |
| 6,665,677 | B1 | 12/2003 | Wotring et al. | 707/100 |
| 6,678,882 | B1 | 1/2004 | Hurley et al. | |
| 6,754,671 | B2 | 6/2004 | Hrebejk et al. | 707/103 |
| 6,859,919 | B1 | 2/2005 | Deffler et al. | 717/100 |
| 2002/0059446 | A1 | 5/2002 | Visalli et al. | 709/236 |
| 2003/0014439 | A1 | 1/2003 | Boughannam | 707/513 |
| 2003/0084424 | A1 | 5/2003 | Reddy et al. | 717/105 |
| 2004/0103393 | A1 | 5/2004 | Reddy et al. | 717/122 |
| 2005/0160401 | A1 | 7/2005 | Russo et al. | 717/108 |
| 2006/0225030 | A1 | 10/2006 | Deffler | 717/104 |

FOREIGN PATENT DOCUMENTS

| | | |
|---|---|---|
| EP | 1 134 949 A2 | 8/2001 |
| GB | 2 227 339 A | 7/1990 |

OTHER PUBLICATIONS

IBM, MVS Programming: Assembler Services Guide, Sep. 1996, Second Edition, "Chapter 10. Symptom Records (SYMBLD and SYMREC Macros)," pp. 1-9.*

Borland, Turbo Assembler Version 3.0, User's Guide, 1991, Chapter 14, pp. 197-212.*

Aho, Alfred V.; Sethi, Ravi; and Ullman, Jeffery D.; Compilers: Principles, Techniques, and Tools; Chapters 1-7; Sep. 12, 1985.*

Peter Hyde; "White Paper: Creating applications with the WebHub VCL"; 1995; pp. 1-19.*

M. Douglas Mc ILroy; "Macro Instruction Extensions of Compiler Languages"; ACM; vol. 3, Issue 4; Apr. 1960; pp. 214-219.*

Alexander Sakharov; "Macro Processing in High-Level Languages"; ACM; vol. 27; No. 11; Nov. 1992; pp. 59-65.*

Liisa Raiha; "A Brief Look at Extension Programming Before and Now"; ACM; vol. 30; No. 2; Feb. 1995; pp. 12-19.*

M.G. Notely; "A Model of Extensible Language Systems"; ACM; Sep. 1971; pp. 29-38.*

"The C Book-Keywords and identifiers"; http://www.phy.duke.edu/-rgb/Genreal/c_book/c_book/chapter2/keywords_and_identifiers; pp. 1-3.*

Mark-Jason Dominus; IEEE; "Perl: Not Just for Web Programming"; Jan.-Feb. 1998; pp. 69-74.*

John K. Ousterhout; "Scripting: Higher-Level Programming for the 21st Century"; IEEE; Mar. 1998; pp. 23-30.*

Norman Ramsey: "Building a Language Independent WEB"; Odyssey Research Associates; Nov. 18, 1998; pp. 1-10.*

"HP Assembler Reference Manual"; Hewlett Packard; Jun. 1998; pp. 1-202.*

Tanner, B.A., "Automating reports with Microsoft Word", M.D. Computing, Mar.-Apr. 1992, USA, vol. 9, No. 2, pp. 108-113, XP002246675, ISSN: 0724-6811.

Cacace et al., "Integrating Object-Oriented Data Modeling With a Rule Based Programming Paradigm," ACM, pp. 225-236, 1990.

Rumbaugh et al., "Object-Oriented Modeling and Design," pp. 69-71, Nov. 14, 1990.

"Information Warehouse: how IBM plans to use its Information Warehouse technology to allow access to data from across IBM platforms—and those of its competitors," (Interview with IBM's Chris Arnold and Willy Chiu) (cover story), DBMS, vol. 5, No. 3, 6 pages, Mar. 1992.

Meng et al., "Construction of a Relational Front-end for Object-Oriented Database Systems," IEEE, pp. 476-483, 1993.

Hsieh et al., "Capturing the Object-Oriented Database Model Relational Form," IEEE, pp. 202-208, 1993.

Ying Yang, "Change Management in Object-Oriented Databases," Proceedings of the International Phoenix Conference on Computers and Communications, pp. 238-244, IEEE, US, Mar. 23, 1993.

Burnett et al., Visual Object Oriented Programming Concepts and Environments, pp. 1-273, 1994.

Forte Software Inc., Product Forte version 1.0 released Jun. 30, 1994, Tool Reference Manual—whole manual.

Forte Software Inc., Product Forte version 1.0 released Jun. 30, 1994, A Guide to the Forte Workshops—whole manual.

Forte Software Inc., Product Forte version 1.0 released Jun. 30, 1994, Framework Project—whole manual.

Forte Software Inc., Product Forte version 1.0 released Jun. 30, 1994, System Management Guide—whole manual.

Kantorowitz, "Algorithm Simplification Through Object Orientation," Computer Science Department, Technion-Israel Institute of Technology, pp. 1-13, 1995.

Meng et al., "A Theory of Translation from Relational Queries to Hierarchical Queries," IEEE Transactions on Knowledge and Data Engineering, vol. 7, No. 2, pp. 228-245, Apr. 1995.

Rational Rose/C++, Round Trip Engineering with Rational Rose C++, Rational Software Corporation, (RAT-C++), pp. 5-227 plus title and copyright pages, Nov. 1996.

Rational Rose, Using Rational Rose 4.0, Rational Software Corporation, (RAT-UR), 213 pages, Nov. 1996.

Unified Modeling Language UML & Booch & OMT, Quick Reference for Rational Rose 4.0, 10 pages, Nov. 1996.

Orfali et al., Client/Server Programming with JAVA and CORBA Second Edition, pp. 1-60, 331-371, 433-518, 711-830, and 905-932 plus 35 pages of title, preface, acknowledgements, contents, and back page, Jan. 30, 1997.

"Logic Works Releases Beta of Object-Relational Modeling Tool for Universal Server Databases," downloaded from microway.com/au/press/logic_umabeta.htm Informix World-wide User Conference, San Francisco, CA, 3 pages, Jul. 22, 1997.

Douglass, "Designing Real-Time Systems with the Unified Modeling Language," Electronic Design, Penton Publishing, Cleveland, OH, US, pp. 132, 134, 136, 138, 140, 142, and cover, vol. 45, No. 20, Sep. 15, 1997.

Pending U.S. Appl. No. 09/418,751, entitled "Method and Apparatus for Providing Access to a Hierarchical Data Store Through an SQL Input," by Tad A. Deffler et al., 9 pages, plus 3 drawing pages, filed Oct. 15, 1999.

International PCT Search Report for PCT/US99/23876, filed Oct. 15, 1999, 4 pages, Feb. 9, 2000.

International PCT Search Report for PCT/US99/24115, filed Oct. 15, 1999, 4 pages, Feb. 7, 2000.

EPO Communication, Ref. GAW/KT/J43248EP, 4 pages, Dec. 27, 2002.

Supplementarty EPO Search Report, 4 pages, Aug. 26, 2003.

OMG Object Management Group, "Catalog of OMG Modeling and Metadata Specifications," 6 pages.

Martin, "Principles of Object-Oriented Analysis and Design," Chapters 5-7 and 10, Jun. 1, 1992.

Gamma, "Design Patterns," Addison-Wesley, ISBN: 978-0201633610, 10 pages, 1994.

Breton et al., "Towards an Understanding of Model Executablity," pp. 70-80, 2001.

Medvidovic, "Modeling Software Architectures in the Unified Modeling Language," pp. 1-57, Jan. 2002.

Engelbert, "An OO interpretation of graphs as meta-CASE's meta-meta-model," pp. 1-10, Sep. 6, 2002.

IDEF Integrated DEFinition Methods, "IDEFIX Data Modeling Method,"4 pages, 2006.

Office Action dated May 23, 2007 for U.S. Appl. No. 10/890,313, May 23, 2007.

CA, "Product Brief; CA Erwin® Data Modeler," pp. 1-7, 2008.

CA, CA Erwin® Data Modeler, 2 pages, 2008.

Office Action dated Feb. 7, 2008 for U.S. Appl. No. 10/890,313.

Communication from EPO, Application No. 04778238.8-1243/1652074 PCT/2004022633, Jul. 14, 2008.

Office Action dated Jul. 22, 2008 for U.S. Appl. No. 11/379,197.

Office Action dated Sep. 12, 2008, for U.S. Appl. No. 10/890,313.

EPO Communication pursuant to Article 94(3), Application No. 99 970 749.0-1243, 4 pages, Nov. 21, 2008.

Hickey, "Callbacks in C++ Using Template Functors," http://www.tutok.sk/fastgl/callback.html, 17 pages, 1994.

USPTO Office Action for U.S. Appl. No. 11/379,197, filed Apr. 18, 2006, inventor Tad A. Deffler, Jan. 22, 2009.

Communication pursuant to Article 94(3) EPC, Application No. 99 953 188.2-1225, Ref. No. HCD/KT/J43277EP, 9 pages, Feb. 4, 2009.

Communication pursuant to Article 94(3) EPC, Application No. 04 778 238.8-1243, Ref No. HCD/J00048582EP, 5 pages, Feb. 16, 2009.

PTO Office Action, U.S. Appl. No. 11/379,197, filed Apr. 18, 2006, inventor Deffler, 13 pages, Jul. 29, 2009.

* cited by examiner

METHOD AND SYSTEM FOR AN EXTENSIBLE MACRO LANGUAGE

CROSS-REFERENCE TO RELATED APPLICATIONS

The present application claims benefit of the filing date of U.S. Patent Application No. 60/104,682 entitled MODELING TOOL SYSTEMS AND METHODS, filed on Oct. 16, 1998.

The present application is related to co-pending U.S. patent application Ser. No. 09/419,736 entitled METHOD FOR DETERMINING DIFFERENCES BETWEEN TWO OR MORE MODELS, being concurrently filed on the same day, which is incorporated by reference herein in its entirety.

The present application is related to a co-pending U.S. patent application Ser. No. 09/419,731 entitled METHOD FOR IMPACT ANALYSIS OF A MODEL, being concurrently filed on the same day, which is incorporated by reference herein in its entirety.

The present application is related to co-pending U.S. patent application Ser. No. 09/418,751 entitled METHOD AND APPARATUS FOR PROVIDING ACCESS TO A HIERARCHICAL DATA STORE THROUGH AN SQL INPUT, being concurrently filed on the same day, which is incorporated by reference herein in its entirety.

The present application is related to a co-pending U.S. patent application Ser. No. 09/420,223 entitled APPARATUS AND METHOD FOR MODELING TOOLS, being concurrently filed on the same day, which is incorporated by reference herein in its entirety.

TECHNICAL FIELD OF THE INVENTION

The present invention relates in general to computer language processors and, particularly to an extensible macro language.

BACKGROUND OF THE INVENTION

A macro is a set of commands that can be played back to perform a given task. Examples of these tasks include inserting a commonly used name and address into a word processor or executing a series of keystrokes to format a file. Tasks performed by macros are typically repetitive in nature allowing significant savings in time by executing the macro instead of manually repeating the commands.

Currently, different applications allow users to write macros and scripts within the confines of the allowed domain, i.e., within the confines of the specific application. For example, word processors typically allow users to create a macro by recording a series of keystrokes to be played back later. Other applications allow users to create macros for retrieving and manipulating data within the confines of the applications. Thus, these applications include a limited set of macros, e.g., macro for recording keystrokes, a macro for retrieving data. The user is then typically limited to the macros provided by the application.

Frequently, however, each user using an application has a unique set of instructions or commands that the user would like to include as a macro in the application which was not previously provided. Because the macros are typically hard coded into the applications or into the macro language included in the applications, the only method currently available for including additional macros into the application is to hard code the new macros into the application by modifying the source code and recompiling it before the new macro can be used. Usually, however, this presents a problem because the user is not given an access to the source code of the macro language or the application to modify. Moreover, it would be a tremendous burden on the application developers to try to cater to each individual user's preferences by customizing the applications to include the macros that the user would like to have.

Therefore, it is highly desirable to have an extensible macro language that would allow users to modify and to extend the language to include their preferences when using the macro language. Furthermore, it is also highly desirable to be able to allow the users to extend the macro without having to modify or access the source code of the macro language since the source code is treated as a proprietary property not distributed to the users.

SUMMARY OF THE INVENTION

To overcome the above shortcomings of the prior art macro language processors in the present invention provides an extensible macro language that allows users to write new macro commands that include procedures tailored to the specific needs of the users without a need to modify any source code of the macro language processor. The extensible macro language is enabled to process the new macro commands by recognizing the new macro commands unknown to the language and associating the new macro commands with procedure calls stored in a registry, i.e., a repository, thereby allowing dynamic extension of a macro language.

In the present invention, a mechanism for dynamically registering new macro commands in a registry is also provided for allowing extensibility. To register new macro commands, the users may insert keywords representing the new macro commands and the associated codes or procedures in the registry for execution by the extensible macro language.

The present invention also defines a simplistic syntax for the extended macro language for recognizing the new macro commands for what they are without needing to know what functions they perform.

According to the goals of the present invention, there is provided a parser and a macro handler for processing macro commands not previously defined in the macro language. The macro commands not previously defined or undefined in the macro language refer to those macro commands that were not included in the set of commands available in the macro language at the time of release and distribution to the users. The parser analyzes keywords in a macro language expression and recognizes one or more keywords representing macro commands that were not previously defined in the macro language. The macro handler receives the keyword in the macro expression and retrieves from a registry of keywords, an executable code associated with the keyword. The executable code is run to process the macro command represented by the keyword. The registry of keywords may be augmented to include any keywords and associated codes for extending the macro language.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DETAILED DESCRIPTION OF THE INVENTION

Figure 1:
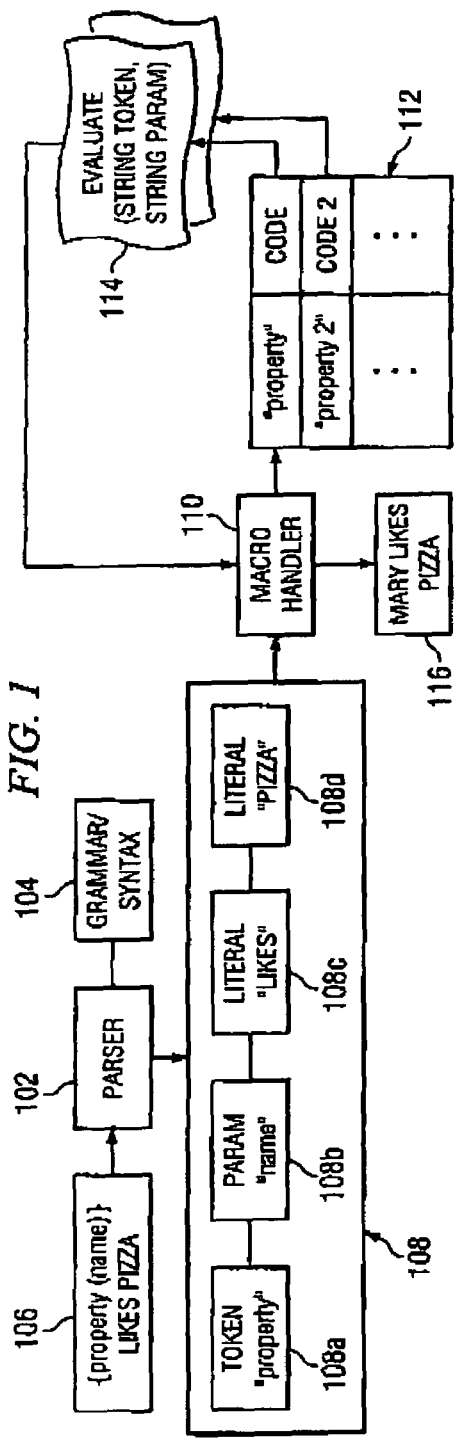
FIG. 1 is a block diagram illustrating the components of the extensible macro language of the present invention.

The present invention is directed to an extensible macro language which may be extended dynamically in the runtime environment without having to rebuild and recompile the macro language. Although the extensible macro language may include a predetermined set of macro commands, the present invention allows users to add additional or new macro commands as desired. FIG. 1 is a block diagram 100 illustrating the components of the system for providing the extensible macro language of the present invention. The parser 102 includes a grammar or syntax 104 that the parser 102 employs to analyze and parse a given expression. As shown in FIG. 1, the parser 102 receives a macro language expression 106 and parses the expression into components according to the syntax 104 of the macro language. The syntax used in one embodiment of the present invention will be described in more detail hereinbelow. Referring back to FIG. 1, the parser 102 reads the expression 106 recognizing certain tokens predefined in the syntax that indicate a presence of a new macro command. In this example, when the parser 102 encounters curly braces in the expression 106, parser 102 treats the keywords, for example, "property (name)", embedded within the braces as a new macro command. Moreover, the parser 102 recognizes, based on the syntax 104, that the "name" embedded within the parenthesis is a parameter to the new macro command. Other aspects of the syntax 104 may dictate that a string of characters outside any symbols to be interpreted as a literal string. Accordingly, the parser 102 breaks each element in the expression into components as shown at 108. A novel feature of the parser 102 in the present invention is that the parser 102 is transparent to the actual content within the tokens, i.e., curly braces. That is, as long as the new macro commands or keywords are embedded within a recognizable token, the parser 102 breaks the keywords down into components regardless of whether the keywords have been predefined in the macro language. Thus, as shown at 108, the macro expression 106 is broken down into components according to the syntax 104 of the extended macro language. The new keyword "property" is broken down as a token component 108a; the string "name" within the parenthesis is broken down as a parameter component 108b; the string "likes" is broken down as a literal component 108c; and the string "pizza" is also broken down as a literal component 108d.

As shown in FIG. 1, the present invention also includes a macro handler 110, and a repository 112 having keywords and their corresponding executable codes. The executable codes may be stored in the repository 112 as a pointer to the actual codes 114 for execution. The repository 112 includes one or more keywords and associated codes, and may be dynamically modified, e.g., new keywords and codes added to it as need arises by a user of the macro language. The repository 112 in the present invention may be a simple file with a table of keywords and associated codes. Alternatively, a separate database may be used as the repository 112.

After the macro expression has been parsed into separate components as described above with reference to the parser 102, the components are then passed to the macro handler 110 for additional processing. For the token component having the keyword "property" 108a, the macro handler checks a repository to the keyword "property". If found, the code associated with the keyword "property" is retrieved and executed. In executing the code, the macro handler 110 passes all the parameters found in the macro expression and parsed as parameters, to the executing code.

The macro handler 110 does not need to know any other processing that may be performed inside the code itself. All that the macro handler 110 needs to recognize is that the "property" is a keyword to be looked up in the repository 112 for its corresponding code, and the specified corresponding code in the repository 112 to be executed with any parameters. The corresponding code is typically specified in the repository 112 as a pointer to the actual code itself 114.

After the proper execution of the code 114 specified in the repository, the macro handler 110 accepts one or more outputs, if any, of the executed code and places the outputs back into the macro expression in place of the keyword. Thus, in the example shown in FIG. 1, the output of the code associated with the "property" with the parameter "name" may be MARY. Consequently, the result of the extended macro expression "{property (name)} likes pizza" at 106 is "Mary likes pizza" as shown at 116.

A novel feature of the present invention is that the macro handler, like the parser, need not know anything in the code or what type of functions are being performed by the executable code. The macro handler merely provides an initiation into the executable code that is associated with the keyword. In an exemplary embodiment of the present invention, it is left up to the users to define exactly what the code should do, and consequently, therefore, what command the keyword is to perform, thus providing a flexible and extensible macro language.

In the above example, the output MARY may have been obtained in various ways transparent to the macro language. For example, the name MARY may have been obtained by performing a search from the World Wide Web, or may have been obtained from a database using a query language, further illustrating the extensibility afforded by the present invention.

The Language Syntax

The syntax or the grammar employed in one embodiment of the extensible macro language will now be described in detail. The extensible macro language of the present invention includes a syntax (FIG. 1 (104)) comprising literals, macros, comments and operator/scoping characters.

Literal

The syntax in this embodiment treats all text outside of curly braces as a literal, and is emitted exactly as typed. Within curly braces, text inside double quotes is treated as a literal. Such a scheme allows for embedding of a literal within macro calls. Some examples of a literal are illustrated as follows:

This text would be emitted just like this;

{"So would this text"}

Macros

Macros include instructions to the macro processor, like procedures or functions in a programming language. According to the syntax defined in the present invention, all macros are embedded within curly braces. In one embodiment, the macros may be categorized as procedure macros and/or iterator macros.

Procedure macros are designed to perform some work. They may expand to a value, they may declare a variable, and/or they may invoke a process. The actions performed are entirely specified by the designer of the macro. In one embodiment, the macros must, however, return a "true" value upon successful completion of their task and a "false" value upon failure.

The following expression illustrates a string literal, followed by a macro call for getting the page number when printing:

| My Model Report - Page {HeaderPage} | : Input |
| My Model Report - Page 1 | : Output |

In the above example, the HeaderPage is a macro defined by a user to extract a page number.

Iterator macros allow the user to traverse across data structures. Iterators are distinguished by the keywords "begin" and "end" that delimit a block of code following the iterator declaration. The code within the "begin/end" block is executed once for each iteration. When the iterator has moved across all objects in its pool, control breaks out of the iteration block and continues to execute a next statement in the macro expression after the block.

The following block of macro expression illustrates a use of the iterator macro:

{
MyIterator
begin
   DoSomething
end
}

In the above example, the procedure macro "DoSomething" executes once for each element returned by the "MyIterator" macro. The curly braces surrounding the entire fragment indicates that all expression within the braces is to be treated as macro code.

Parameters

The syntax defined in the extensible macro language of the present invention allows for both procedure and iterator to accept and process parameters. Parameters may include strings, or other macros. To distinguish parameters, the parameters are enclosed within parenthesis following the macro. Macros may accept variable-length parameter lists, as desired. The following illustrates a macro expression having a parameter "foo":

{MacroWithParameters ("foo")}

Control Blocks

In some instances, it is desirable to have a block of a macro expression to fail if any portion of it fails. The following example illustrates one such instance:

{FirstName [MiddleInitial "."] LastName}

If there was no middle initial, the MiddleInitial macro would return a nil value or a fail value. In that case, the literal "." should not be printed. To accommodate for such conditions, the present invention includes in its syntax, square brackets ("[ ]") that denote a conditional expression. Thus, if the macro within the square brackets fails, the rest of the expression in the square brackets is not emitted. In the above example, if the MiddleInitial failed for lack of value, the literal "." is not be printed.

The conditional blocks have internal scope, i.e., the failure of a conditional block does not affect the surrounding code. For conditions in a block to affect the outer block, the syntax additionally includes what is referred to as a propagating conditional denoted by angle brackets. If any macro within a pair of angle brackets fails, the block within the angle brackets as well as the next outer block fails. The following examples illustrate a macro expression with a conditional and propagating conditional:

| { Print " " [ Print [ Fail ] ] } | : input |
| foo foo | : output |
| { Print " " [ Print < Fail > ] } | : input |
| foo | : output |

In both examples the "Print" macro outputs the word "foo". In the first example, the failed macro in square brackets is contained within its block. Thus, the next outer block having "Print" is executed as well as the first "Print", resulting in the output "foo foo". In the second example, when a macro within angle brackets fails, the failure is propagated to the next block having the "Print" macro. Thus, the next outer block with "Print" is not executed. Since this Print macro is contained within a pair of square brackets, the failure is contained in the block. Thus, the first "Print" macro is executed, resulting in the output "foo".

Figure 2:
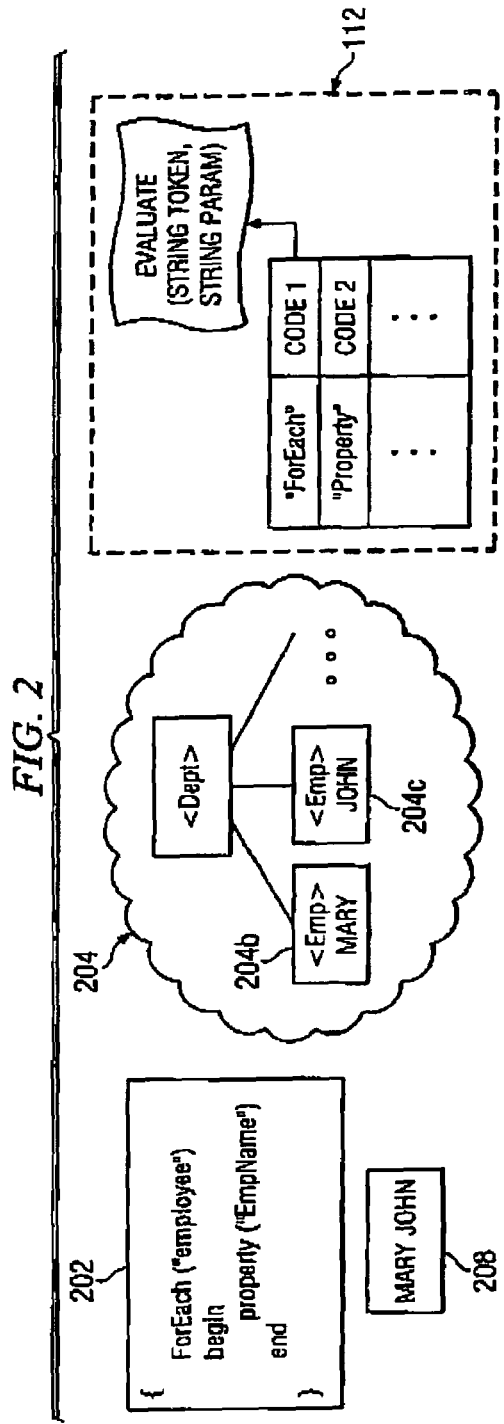
FIG. 2 illustrates an example of a macro expression having an iterator macro.

FIG. 2 illustrates an example of a macro expression including an iterator macro of the present invention. As described with reference to FIG. 1, the keyword "ForEach" is recognized by the parser 102 (FIG. 1) as a macro, and the word "Employee" is recognized as a parameter to the macro "ForEach". When the macro handler receives the token keyword "ForEach", the macro handler 110 (FIG. 1) performs a look-up of the keyword "ForEach" in the registry 112 and executes the corresponding code. The code for "ForEach" macro, for example, may include instructions to perform commands found within the begin/end block of the macro expression for all sub-objects 204b and 204c in a given object 204 having the type of the specified parameter "employee". In this macro expression 202, another macro exists within the begin/end block. Accordingly, the macro handler 110 (FIG. 1) performs a look-up of the keyword "Property" in the registry 112 and executes the corresponding code for each of the sub-objects 204b and 204c having employee type as specified in the "ForEach" keyword. The code associated with the "Property" keyword, for example, may include instructions to print the value of the type specified in the parameter of the keyword "Property", in this case, an employee name as specified by "EmpName". Consequently, the result of the macro expression 202 is the output shown at 208, "Mary John".

The extensible macro language of the present invention is useful for customizing macros specific to the needs of individual users. For example, the extensible macro language has been interfaced with the UMA Model for retrieving various objects from the UMA Model, as desired by a user. The UMA is disclosed in a co-pending U.S. patent application Ser. No. 09/420,223 entitled APPARATUS AND METHOD FOR MODELING TOOLS, filed on Oct. 15, 1999, the disclosure of which is incorporated herein by reference in its entirety thereto. Appendix A includes a brief description of the extensible macro language of the present invention as used in the UMA Model and referred to as the UMA Template Language. The description in Appendix A explains one embodiment of the extensible macro language and should in no way be read as limiting the scope and capabilities of the extensible macro language to the descriptions contained therein.

While the invention has been particularly shown and described with respect to an embodiment thereof, it will be understood by those skilled in the art that the foregoing and other changes in form and details may be made therein without departing from the spirit and scope of the invention.

What is claimed is:

1. A method for providing an extensible macro language comprising:
maintaining, in a repository, a predefined macro language comprising a plurality of keywords and a plurality of associated commands for execution;
using a parser to parse a macro language expression to identify a new keyword in the macro language expression that is not within the plurality of keywords in the predefined macro language;
using a macro handler comprising a macro processor to retrieve, from a registry of keywords and associated executable codes, an executable code associated with the new keyword identified in the macro language expression, the executable code corresponding to a procedure that is not performed by the execution of the predefined macro language alone; and
using the macro handler to execute the executable code retrieved from the registry to run the extended macro command associated with the new keyword in the macro language expression without recompiling the macro language, the executable code associated with the new keyword not included in the predefined macro language and resulting in the performance of a procedure that is not performed by execution of the predefined macro language alone.

2. The method of claim 1, further comprising:
extending the registry of keywords and associated executable codes by inserting a new keyword representing a new extended macro command and a new executable code associated with the new keyword.

3. The method of claim 1, wherein the executable code includes machine operable instructions.

4. The method of claim 1, wherein identifying the new keyword in the macro language expression comprises recognizing one or more tokens in the macro language expression, and the method further comprises determining based on the predefined macro language that each token indicates the presence of a new macro command associated with the new keyword that is not included in the predefined macro language.

5. The method of claim 1, further comprising breaking the macro language expression down into a plurality of elements, at least one of the plurality of elements comprising a pointer to the extended macro command.

6. The method of claim 1, wherein the registry of keywords comprises a table of keywords and associated macro commands.

7. The method of claim 1, wherein the registry of keywords comprises a database of keywords and associated macro commands.

8. The method of claim 1, wherein the executable code retrieved from the registry to run the extended macro command associated with the new keyword in the macro language expression is executed without modifying the source code of the macro language.

9. A system for providing an extensible macro language, comprising:
a macro handler comprising a macro processor operable to maintain, in a repository, a predefined macro language comprising a plurality of keywords and a plurality of associated commands for execution;
a parser operable to parse a macro language expression to identify a new keyword in the macro language expression that is not within the plurality of keywords in the predefined macro language; and
a registry of keywords and associated executable codes, including one or more keywords and one or more executable codes that are not included in the predefined macro language, each keyword being associated with a respective one of the executable codes, each executable code corresponding to a procedure that is not performed by the execution of the predefined macro language alone,
wherein the macro handler is further operable to receive the new keyword from the parser, retrieve, from the registry of keywords and associated executable codes, the executable code associated with the new keyword identified within the macro language expression, and execute the retrieved executable code to run the extended macro command associated with the new keyword without recompiling the macro language, the executable code associated with the new keyword not included in the predefined macro language and resulting in the performance of a procedure that is not performed by execution of the predefined macro language alone.

10. The system of claim 9, wherein the registry of keywords and associated executable codes is operable to be extended to include one or more new keywords and one or more new executable codes, each new keyword being associated with a respective one of the new executable codes.

11. The system of claim 9, wherein when identifying the new keyword in the macro language expression the parser is operable to:
recognize one or more tokens in the macro language expression; and
determine based on the predefined macro language that each token indicates the presence of a new macro command associated with the new keyword that is not included in the predefined macro language.

12. The system of claim 9, wherein the parser is further operable to break the macro language expression down into a plurality of elements, at least one of the plurality of elements comprising a pointer to the extended macro command.

13. The system of claim 9, wherein the registry of keywords comprises a table of keywords and associated macro commands.

14. The system of claim 9, wherein the registry of keywords comprises a database of keywords and associated macro commands.

* * * * *